United States Patent [19]
McCreary

[11] Patent Number: 5,429,244
[45] Date of Patent: Jul. 4, 1995

[54] RESCUE KIT

[76] Inventor: James L. McCreary, 100 Mayview Dr., Powell, Tenn. 37849

[21] Appl. No.: 117,728

[22] Filed: Sep. 7, 1993

[51] Int. Cl.6 .................. B64B 1/50; B65D 85/00
[52] U.S. Cl. ..................... 206/573; 116/210; 116/DIG. 9; 206/223; 206/803
[58] Field of Search ............... 206/573, 227, 803; 116/210, DIG. 9; 244/33; 441/30

[56] References Cited

U.S. PATENT DOCUMENTS

| | | | |
|---|---|---|---|
| 3,254,756 | 6/1966 | Rankin | 206/803 |
| 3,371,771 | 3/1968 | Bugyi | 206/803 |
| 3,941,079 | 3/1976 | McNeill | 116/DIG. 9 |
| 3,951,260 | 4/1976 | Frazee | 206/803 |
| 3,964,427 | 6/1976 | Murphy | 116/210 |
| 4,042,882 | 8/1977 | Camacho et al. | 116/210 |
| 4,094,267 | 6/1978 | Davis, Jr. . | |
| 4,114,561 | 9/1978 | Asaro . | |
| 4,120,259 | 10/1978 | Wilson . | |
| 4,169,550 | 10/1979 | Williams | 206/803 |
| 4,186,426 | 1/1980 | Gingras, Sr. et al. | 206/803 |
| 4,219,819 | 8/1980 | Patel . | |
| 4,295,438 | 10/1981 | Porter . | |
| 4,437,568 | 3/1984 | Hamblin | 206/573 |
| 4,696,252 | 9/1987 | Grill | 116/DIG. 9 |
| 4,697,706 | 10/1987 | Schaller . | |
| 4,787,575 | 11/1988 | Stewart . | |
| 4,800,835 | 1/1989 | Mears . | |
| 4,815,677 | 3/1989 | Rushing et al. . | |
| 4,836,128 | 6/1989 | Walker . | |
| 4,901,664 | 2/1990 | Labrecque . | |
| 4,917,041 | 4/1990 | Weiswurm et al. . | |
| 4,944,242 | 7/1990 | Russell . | |
| 5,005,513 | 4/1991 | Van Patten et al. . | |
| 5,007,367 | 4/1991 | Matteucci et al. . | |
| 5,020,467 | 6/1991 | Van Patten et al. . | |
| 5,049,106 | 9/1991 | Kim et al. . | |
| 5,095,845 | 3/1992 | Murphy . | |

FOREIGN PATENT DOCUMENTS 0658710  3/1963  Canada ........................... 116/210

Primary Examiner—Jimmy G. Foster
Attorney, Agent, or Firm—Pitts & Brittian

[57] ABSTRACT

A rescue kit (10) for marking the position of a person or persons. The rescue kit (10) includes a balloon (12) having a body and a neck, and a canister (34) defining a cavity for containing a lighter-than-air gas (18) for inflating the balloon (12). The canister (34) is provided with a hole (58) for accessing the cavity and is provided with a membrane (26) covering the hole (58). The rescue kit (10) also includes a spool (32) which receives a securing line (20). The securing line (20) defines first and second ends, the first end of the securing line (20) being attached to the balloon (12), and the second end of the securing line being attached to the spool (32). Further, an inflating mechanism (50) is provided for selectively rupturing the membrane (26) of the canister (34) and communicating the lighter-than-air gas (18) from the canister (34) to the balloon (12).

6 Claims, 4 Drawing Sheets

RESCUE KIT

TECHNICAL FIELD

This invention relates to the field of devices used in aiding in the finding and rescue of distressed people. More specifically, the present invention provides an easily deployed balloon which will mark a distressed person's position. In addition, the rescue kit will provide several items which will help the distressed person cope with some of the crises which may arise between the time that the distress occurs and the time that the distressed person is rescued.

BACKGROUND ART

In 1992, the National Park Service conducted about 5,000 missions to rescue lost hikers, climbers, campers, and the like, at a total cost of $3 million. Because of this, the National Park Service is planning on instituting a program, beginning on a test basis in two parks in the spring of 1994, whereby the rescued persons will pay for the cost of the mission. The cost of a rescue mission is directly proportional to the amount of time and complexity involved in the given operation. Thus, it is in a lost person's best economic interest to be found quickly.

More importantly, however, exposure to the elements while lost can lead to a host of health problems. Although not an exhaustive list, these health problems can include gangrene and infection associated with broken bones or internal injuries, dehydration, starvation, hypothermia, frostbite, and even death. Thus, it is also in a lost person's best physical interest to be found quickly.

The use of devices incorporating balloons to indicate the position of lost persons, whether lost aircraft passenger, water-going-vessel passenger, hiker, hunter, or the like, is well-known in the art. These devices usually consist, at the minimum, of a balloon, a cartridge or canister filled with a lighter-than-air gas, and a means of delivering the gas into the balloon. The balloon, filled with the lighter-than-air gas, rises and marks the position of the distressed person. Examples of several such devices include U.S. Pat. No. 5,095,845, issued to Betty J. Murphy on Mar. 17, 1992; U.S. Pat. No. 5,049,106, issued to Sunyong Kim and Dae W. Lee on Sep. 17, 1991; U.S. Pat. No. 5,020,467, issued to Norman Van Patten and Blaine Van Patten on Jun. 4, 1991 ("Van Patten I"); U.S. Pat. No. 5,005,513, issued to Norman Van Patten, Blaine Van Patten, and Vernon Dillenbeck on Apr. 9, 1991 ("Van Patten II"); U.S. Pat. No. 4,944,242, issued to Donald H. Russell on Jul. 31, 1990; U.S. Pat. No. 4,917,041, issued to Klaus D. Weiswurm, Hubert L. Risinger, and Andrew B. Phillips on Apr. 17, 1990; U.S. Pat. No. 4,901,664, issued to Sylva Labreque on Feb. 20, 1990; U.S. Pat. No. 4,836,128, issued to Kevin J. Walker on Jun. 6, 1989; U.S. Pat. No. 4,815,677, issued to John A. Rushing, Sam Harris, and Ross S. Penney on Mar. 28, 1989; U.S. Pat. No. 4,800,835, issued to Arthur W. Mears on Jan. 31, 1989; U.S. Pat. No. 4,787,575, issued to Ronald R. Stewart on Nov. 29, 1988; U.S. Pat. No. 4,697,706, issued to Donald L. Schaller on Oct. 6, 1987; U.S. Pat. No. 4,295,438, issued to Howard L. Porter on Oct. 20, 1981; U.S. Pat. No. 4,219,819, issued to Rasik M. Patel on Aug. 26, 1980; U.S. Pat. No. 4,120,259, issued to Gene W. Wilson on Oct. 17, 1978; U.S. Pat. No. 4,114,561, issued to Vito F. Asaro on Sep. 19, 1978; and U.S. Pat. No. 4,094,267, issued to John Davis, Jr. on Jun. 13, 1978.

Typical of problems with devices in this field are the complexity of assembly, mechanical complexity and attendant breakdowns, and unreliability. For instance, many devices come disassembled, and two or more parts must be assembled before the device can be used. This is a problem for several reasons. First, the distressed person might be injured and has only one hand available for use. This person would not be able to assemble anything complex. Second, if it was dark or cold or the distressed person was in water, assembly would be very hard.

Many devices use complex mechanical arrangements, usually to release the lighter-than-air gas, which employ two or more parts moving in concert. The more moving parts that are employed, the more likely it is that the mechanical device will break down. An inoperative device would be of no use.

Furthermore, many devices in this field do not have reliable seals for keeping the gas in the balloon or the gas canister. Many also specify that the gas canister is to be carried aloft with the balloon. This drastically reduces time aloft since the combination of the balloon and the canister weighs much more than the balloon alone.

In addition, none of the above mentioned devices include any items to help the distressed person during the time before help arrives. Many people who end up being distressed are lost day hikers or passengers of capsized boats or downed planes. These people usually do not carry provisions for being outside overnight as might persons who regularly go on longer hikes and the like. A lost day hiker, for example, might need some way to stay warm at night or a means for generating light. None of the above mentioned devices provide anything like this.

Therefore, it is an object of this rescue kit to provide an easily deployed balloon for marking the location of a distressed person. The device will require only one hand to operate and may be used while the person is in water or while the person is wearing gloves. It is also an object of the rescue kit to provide a balloon with a sealed neck so that the canister does not have to be carried aloft. It is a further object of the rescue kit to provide a canister for holding a lighter-than-air gas which has a reliable seal for keeping the gas in the canister until it is needed. Another object of the rescue kit is to provide a balloon and attendant inflating mechanism which has a minimal number of moving parts so as to vastly limit possible mechanical breakdown. Yet another object of the rescue kit is to provide items which will help the distressed person deal with certain crises which might arise before help arrives.

DISCLOSURE OF THE INVENTION

Other objects and advantages will be accomplished by the present invention which provides a balloon for marking the position of a lost person or persons, a means for inflating the balloon, and several items for helping the distressed person cope with certain crises that may arise if the distressed person is not found immediately. The rescue kit of the present invention includes a balloon, a canister containing lighter-than-air gas, an inflating mechanism for directing the lighter-than-air gas from the canister and into the balloon, and a securing line. The inflating mechanism includes a plunger for initiating the flow of the gas and a plunger disabling mechanism which keeps the plunger from initiating the flow of the gas.

The canister is a typical canister which contains lighter-than-air gas. The canister has a hole in it, across which is a membrane for keeping the lighter-than-air gas in the canister.

The securing line is attached, on one end, to the neck of the balloon, and, on the other end, to the canister or a spool fitted over the canister. The rest of the string is, in the pre-use position, wrapped around the canister or spool.

The inflating mechanism is a mechanism which is dimensioned so as to accept the canister. The inflating mechanism includes a plunger and a plunger disabling mechanism. The inflating mechanism includes a tube protruding from the inflating mechanism. The tube could be relatively tube-like or could be a nipple integrally formed with the inflating mechanism. The neck of the balloon is fitted over the tube. The tube directs the lighter-than-air gas into the balloon as the lighter-than-air gas inflates the balloon.

The plunger has a piercing member on its first end. The piercing member is dimensioned so as to be easily accepted into the hole in the canister. The piercing member pierces the membrane, thus, releasing the lighter-than-air gas. The lighter-than-air gas passes out of the canister, through the tube, and into the balloon.

The plunger disabling mechanism prevents the plunger from initiating the flow of lighter-than-air gas out of the canister. The plunger disabling mechanism can be relatively disc-like with a selected thickness. However, the plunger disabling mechanism could be any device which substantially prevents accidental activation of the plunger. This could include a cap which, although not shown, fits over the plunger.

If, however, the plunger disabling mechanism is disc-like, there is a slot cut into the disc-like portion from the edge to the center. This slot is dimensioned so as to accept the plunger while the plunger is fully extended such that the piercing member is away from the membrane. The plunger also includes a finger ring which is dimensioned so as to receive a finger or other protruding object.

The user activates the device by removing the plunger disabling mechanism and pushing down on the plunger. This operation can easily be done with one hand as the plunger disabling mechanism is designed such that it may be removed with one's teeth or by hooking it over a protruding object and pulling. By pushing down on the plunger, the user causes the piercing member to pierce the membrane, releasing the lighter-than-air gas. The gas escapes from the canister, through the tube, into the balloon. When the balloon is sufficiently inflated, it is pulled off of the tube. The gas is kept in the balloon by a self-sealing neck. Alternatively, a neck-closing piece is used. This neck-closing piece is tight enough to keep the neck of the balloon on the tube during inflation. After inflation, the neck-closing-piece and the balloon are removed in concert. This closes off the neck of the balloon once both the balloon and the neck-closing piece are off the tube. The securing line is then be unreeled, allowing the balloon to rise the length of the securing line.

The rescue kit can also contain a tightly packed thermal blanket, a lightstick or other non-flammable, long-lasting light source, waterproof matches, a ground flare, and a police whistle.

BRIEF DESCRIPTION OF THE DRAWINGS

The above mentioned features of the invention will become more clearly understood from the following detailed description of the invention read together with the drawings in which:

FIG. 1 also illustrates the spool as being designed to fit over the canister;

FIG. 2 also illustrates the cap as being designed to fit over the canister;

FIG. 3 also illustrates the spool and cap as being integral parts of the canister;

BEST MODE FOR CARRYING OUT THE INVENTION

Figure 1:
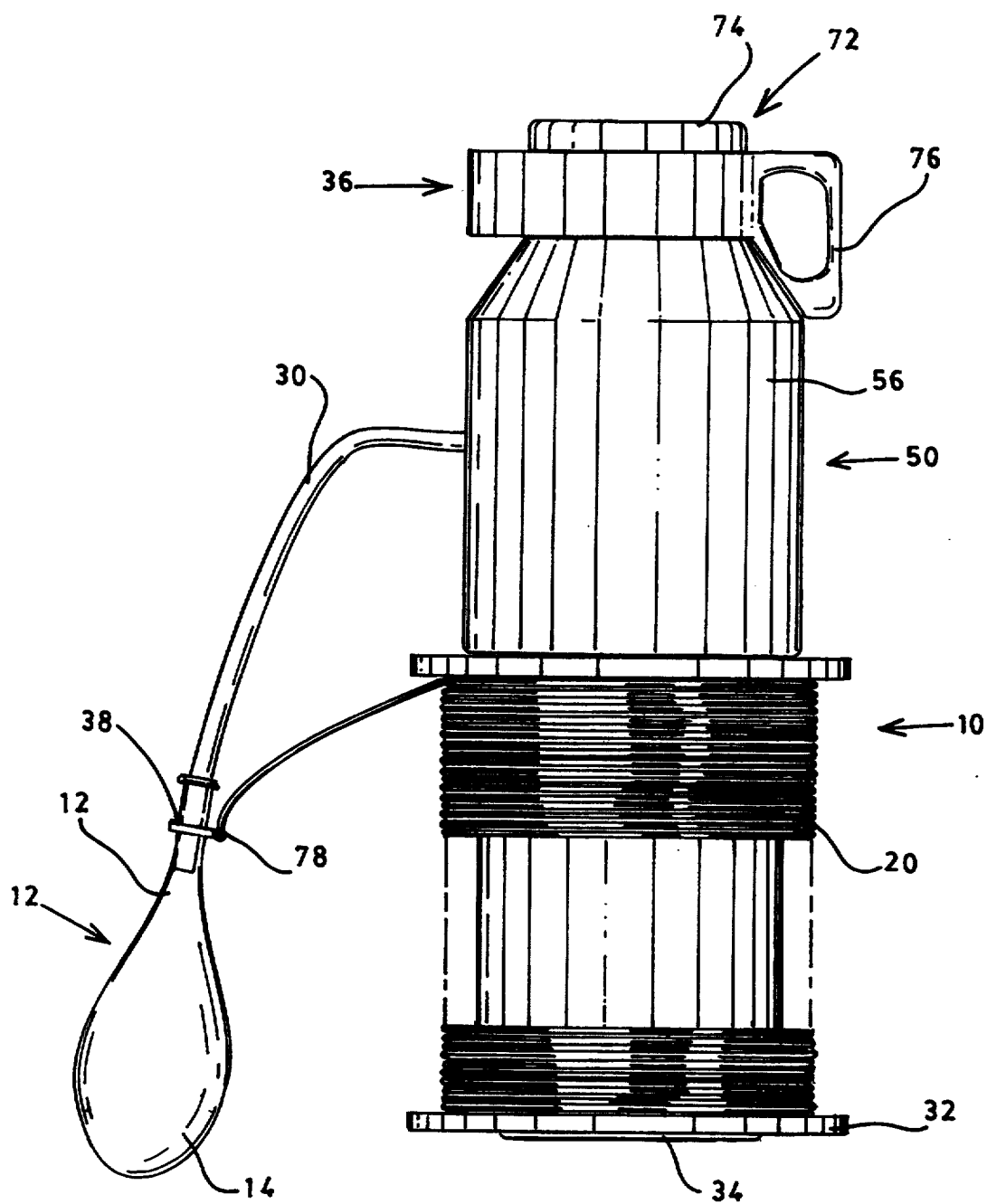
FIG. 1 is a side elevation view of the rescue kit constructed in accordance with several features of the present invention showing the rescue kit before the inflation of the balloon.
Figure 2:
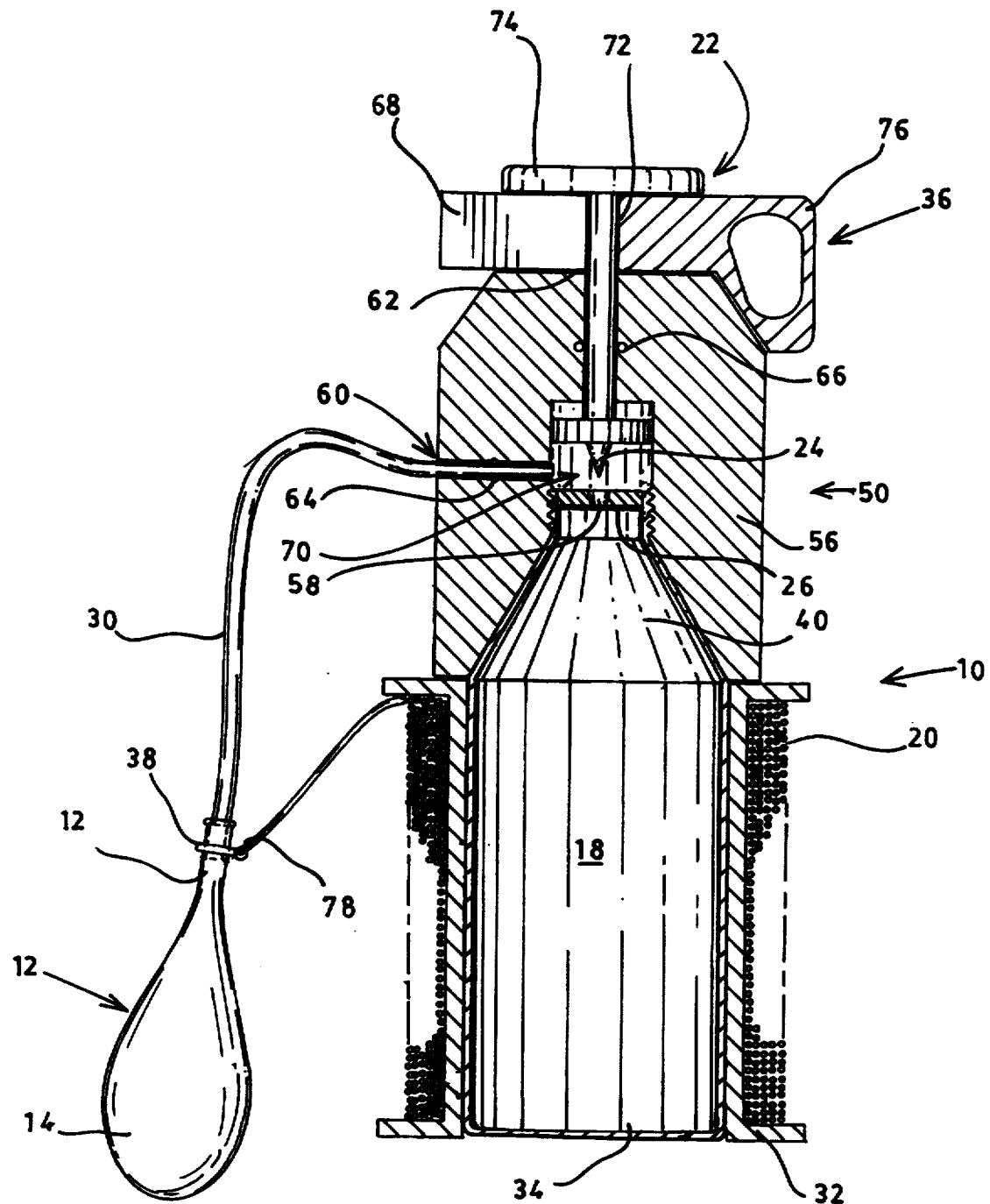
FIG. 2 illustrates a partial side elevation view, in section, of the rescue kit of FIG. 1.
Figure 3:
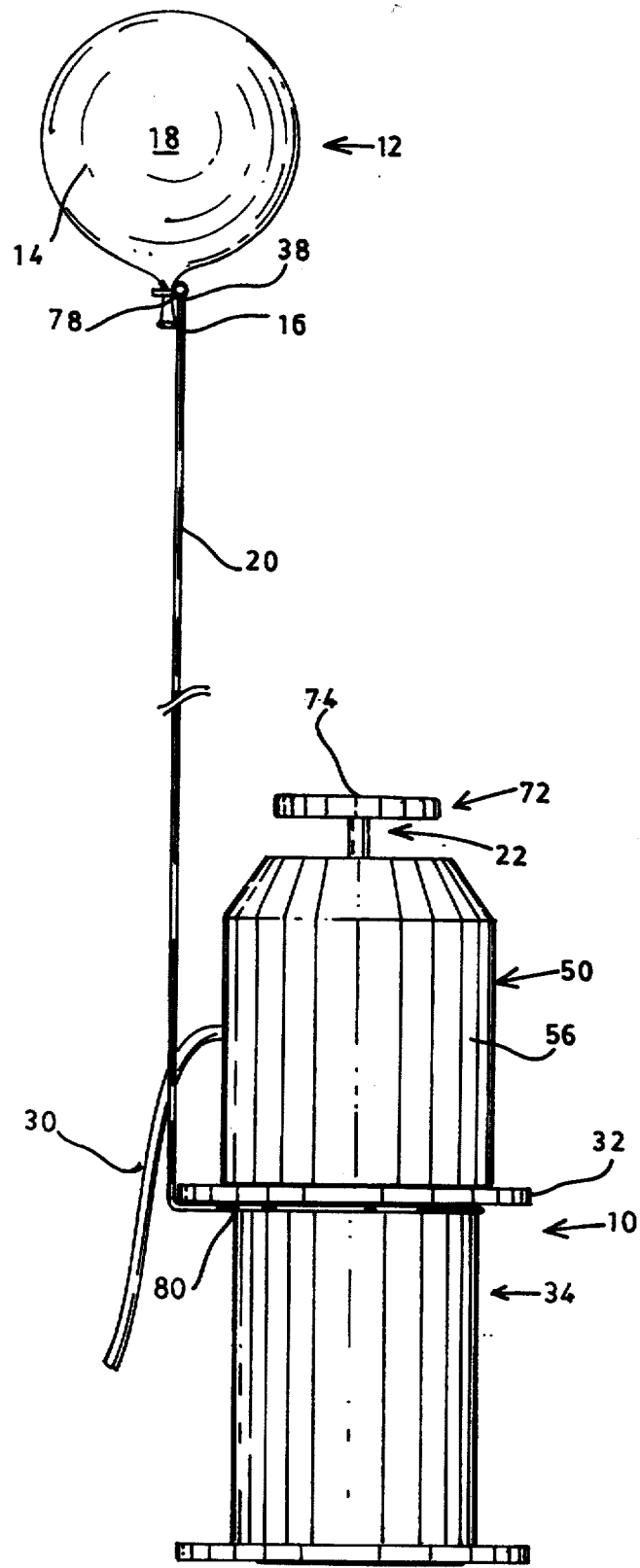
FIG. 3 is a side elevation view of the rescue kit after the balloon has been inflated and set aloft.

A rescue kit incorporating various features of the present invention is illustrated generally at 10 in the figures. The rescue kit 10 is designed to provide a balloon 12 to be inflated with a lighter-than-air gas 18. The balloon 12 is tethered by a securing line 20 and allowed to rise, thus marking the position of a distressed person or persons. Moreover, in an alternate embodiment, the rescue kit 10 may provide other items, such as a tightly packed thermal blanket 42, a lightstick 44 or other non-flammable, light-emitting source, waterproof matches 46, a ground smoke flare 48, and a police whistle 52. These other items help the distressed person cope with certain crises which may occur before he or she is rescued. All of these items are packed into a waterproof pouch 54 which is be small enough to be comfortably worn while hiking.

In the preferred embodiment of the present invention, the rescue kit 10 includes a canister 34 filled with lighter-than-air gas 18, an inflating mechanism 50, a balloon 12, and a securing line 20.

The canister 34 of the preferred embodiment is a small, metal container filled with a pressurized, lighter-than-air gas 18. The canister 34 is small enough to fit into the pouch 54 but large enough to hold an amount of lighter-than-air gas 18 capable of keeping the balloon 12 aloft for several hours. The canister 34 has a neck 40 with a hole 58 bored through the top of the neck 40. However, there is a membrane 26, inside the neck 40 and across the hole 58, which serves to keep the lighter-than-air gas 18 from escaping.

The inflating mechanism 50 of the preferred embodiment comprises a cap 56, a tube 30, a plunger 22, and a plunger disabling mechanism 36. The cap 56 is dimensioned to securely receive the neck 40 of the canister 34. In an alternate embodiment, however, the cap 56 can be formed integrally with the canister 34. The cap 56 also includes a top opening 62 and a side opening 60.

In the preferred embodiment, the tube 30 is dimensioned so as to be securely accepted into the side opening 60, such that, when the gas 18 is released, the gas 18 does not escape around the tube 30 but instead goes through the tube 30. To aid in this, in an alternate embodiment, a first O-ring 64 is included and is dimensioned so as to fit around the tube 30 inside the side opening 60, thus helping to prevent the escape of gas 18 around the tube 30. However, in an alternative embodiment, the tube 30 can be a nipple formed integrally with the cap 56.

The plunger 22 of the inflating mechanism 50 of the preferred embodiment is relatively rod-like, defining a first end 70 and a second end 72, dimensioned so as to be securely accepted into the top opening 62, such that the gas 18, when released, does not escape around the plunger 22 but instead is forced through the side opening 60. To aid in this, in an alternate embodiment, a second O-ring 66 is included and is dimensioned so as to securely accept the plunger 22 and fit securely inside the top opening 62. The plunger 22 includes, on its first end 70, a piercing member 24. The piercing member 24 is designed so that, when engaged, the piercing member 24 passes through the hole 58 in the neck 40 of the canister 34. In so doing, the piercing member 24 pierces the membrane 26, allowing the gas be to escape. The second end 72 of the plunger 22 contains a knob 74 which is relatively disc-like with a selected thickness. The plunger 22, knob 74, and piercing member 24 may be formed integrally or as two or three parts to be assembled by the manufacturer.

Figure 4:
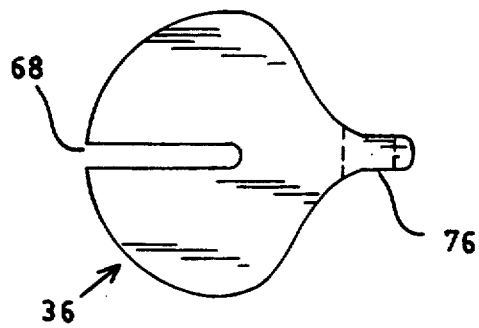
FIG. 4 illustrates a top plan view of the plunger disabling mechanism of a rescue kit of the present invention.
Figure 5:
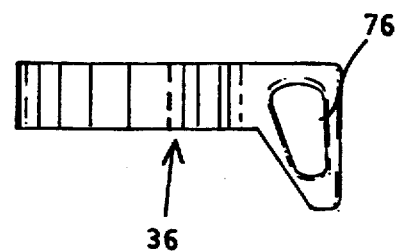
FIG. 5 illustrates a side elevation view of the plunger disabling mechanism of a rescue kit of the present invention.

There is also be a plunger disabling mechanism 36 in the preferred embodiment. When in place, the plunger disabling mechanism 36 ensures that the plunger 22 can not be enabled. The plunger disabling mechanism 36, as best shown in FIG. 4, is relatively disc-like with a selected thickness. There is a slot 68 cut into the plunger disabling mechanism 36, through the entire thickness of the plunger disabling mechanism 36, and which is cut from the edge to a point proximate to the center of the plunger disabling mechanism 36. The slot 68 is dimensioned to be slightly less wide than the plunger 22 so that the plunger disabling mechanism 36 is held in place by friction. When in place, the plunger disabling mechanism 36 meets the knob 74 of the plunger 22 on the underside of the knob 74. The thickness of the plunger disabling mechanism 36 is a distance that will ensure that, if the plunger disabling mechanism 36 is in place, the piercing member 24 can not be in contact with the membrane 26. There is a finger ring 76 located approximately 180 degrees from the slot 68 on the plunger disabling mechanism 36. The finger ring 76 is integrally formed part of the plunger disabling mechanism 36. In another embodiment, however, the finger ring 76 is a separate piece secured to the plunger disabling mechanism 36. The finger ring 76 protrudes from the plunger disabling mechanism 36 and has a hole through it capable of accepting a finger, although any protruding object could be used, so that the plunger disabling mechanism 36 can be pulled off of the inflating mechanism 50. Then, the user can enable the plunger 22.

The balloon 12 of the preferred embodiment consists of a main body 14 and a neck 16. The balloon 12 can be made from any material, although a shiny, metallic-looking material capable of reflecting electro-magnetic radiation in the visual spectrum is preferable. The material should also be capable of retaining the lighter-than-air gas 18 for several hours. The balloon 12 can be self-sealing or can include a neck-closing piece 38, such as a rubber band or a clip, which would seal the neck 16 of the balloon 12 by pressure, thus, keeping the lighter-than-air gas 18 in the balloon.

In the preferred embodiment, the invention includes a securing line 20. The securing line 20 defines a first end 78 and a second end 80. The securing line 20 is any line, string, or filament capable of tethering the balloon 12. Preferably, the securing line 20 is strong enough that it will not break simply because of the tension on it as the balloon 12 is raised by the lighter-than-air gas 18, or as the balloon 12 is battered by the wind. The securing line 20 can be any length but should be long enough that the balloon 12 can rise above such visual obstructions as trees, in order to be seen. The securing line 20 is attached to a spool 32 which is dimensioned to receive the canister 34. However, in an alternate embodiment, the spool 32 can be formed integrally as part of the canister 34.

Figure 6:
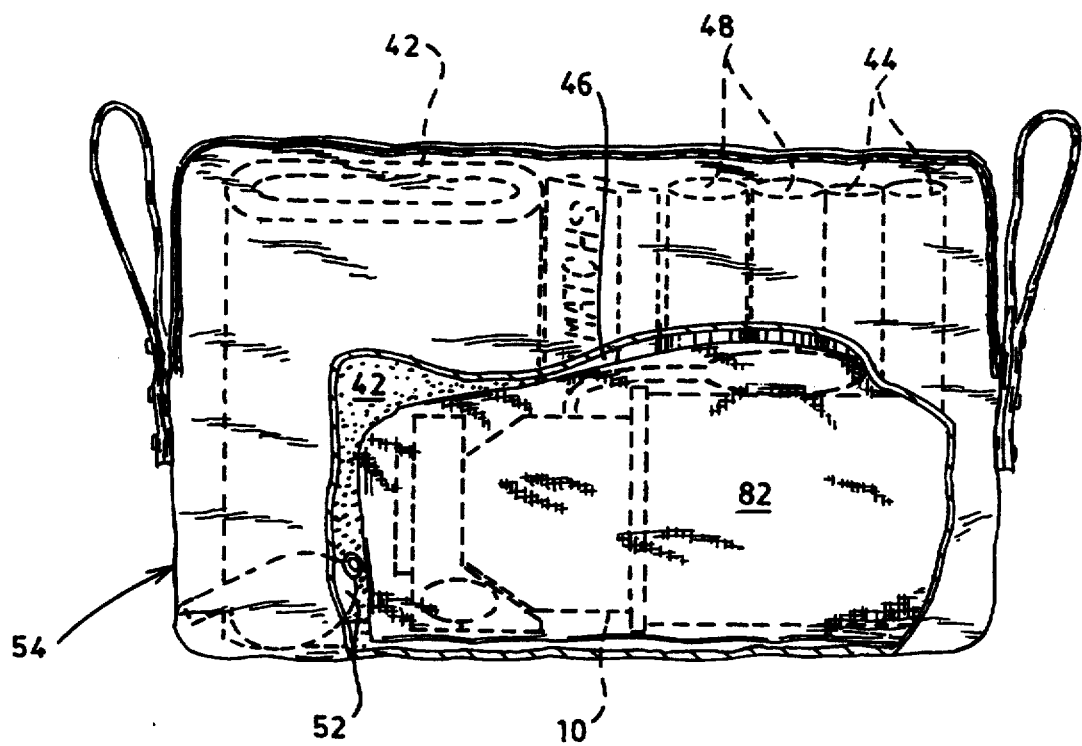
FIG. 6 illustrates a side elevation view, partially in section, of the waterproof pouch which contains the sealed, waterproof bag, lightstick, thermal blanket, waterproof matches, whistle, and ground flare of a rescue kit of the present invention.

The rescue kit 10 is placed into a waterproof pouch 54. In an alternate embodiment, the rescue kit 10 is inside an additional sealed, waterproof bag 82 which is placed inside the pouch 54, as in FIG. 6.

To activate the rescue kit 10, the user removes the rescue kit 10 from the pouch 54 and, if an alternate embodiment, the bag 82. The user holds the rescue kit 10 in one hand, puts a finger through the finger ring 76 of the plunger disabling mechanism 36, and pulls off the plunger disabling mechanism 36. If, due to injury or some other circumstance, the user is unable to use a finger, any protruding object which fits can be inserted into the finger ring 76, or the user can even use his or her teeth. The removal of the plunger disabling mechanism 36 allows the plunger 22 to be enabled.

The user enables the plunger 22 by pushing down on it. Once again, a free hand is not needed for this operation as the plunger 22 can be pressed against the user's body or the ground. This pushing down of the plunger 22 forces the piercing member 24 through the hole 58 in the neck 40 of the canister 34 and causes the piercing member 24 to pierce the membrane 26. This will release the lighter-than-air gas 18 from the canister 34. Due to the tight seal formed at the top opening 62 and the side opening 60 of the cap 56, the lighter-than-air gas 18 can only pass through the tube 30 and into the balloon 12.

When the balloon 12 is completely inflated, or before, if so desired by the user, the user pulls the balloon 12 off of the tube 30. In the preferred embodiment, the neck 16 of the balloon 12 is self-sealing so as to keep the lighter-than-air gas 18 in the balloon 12. In an alternate embodiment, the neck 16 of the balloon 12 may be held to the tube 30 by a neck-closing piece 38. The pressure of the neck-closing piece 38 on the neck 16 of the balloon 12 which is on the tube 30 causes the neck 16 of the balloon 12 to stay on the tube 30 by friction. If this alternate embodiment is used, the neck-closing piece 38 and the balloon 12 are removed from the tube 30 in concert. Once off of the tube 30, the tightness of the neck-closing piece 38 automatically closes the neck 16 of the balloon 12, thus, preventing the escape of the lighter-than-air gas 18 from the balloon 12.

The user then unreels the securing line 20 from the spool 32, allowing the balloon 12 filled with the lighter-than-air gas 18 to float upward. When the securing line 20 is unreeled to the desired length, up to a maximum of the securing line's 20 full length, the user can tie down, or tether, the securing line 20 to a nearby object or may hold the spool 32.

From the foregoing description, it will be recognized by those skilled in the art that a rescue kit offering advantages over the prior art has been provided. Specifically, the rescue kit 10 provides an easily deployed, portable means of marking the location of a distressed person or persons. In addition, if other items are provided, as in an alternate embodiment, the rescue kit 10 provides certain items for helping the distressed person or persons cope with some of the crises that may arise before the distressed person or persons are found.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A rescue kit for marking the position of a person to be used in conjunction with a canister defining a cavity containing a lighter-than-air gas, the canister being provided with an opening accessing the cavity and a membrane for sealing the canister opening, said rescue kit comprising:

a balloon including a body and a neck;

a spool defining a cylindrical opening dimensioned to receive the canister in a friction fit;

a securing line defining first and second ends, said first end of said securing line being secured to said balloon, said second end of said securing line being secured to said spool;

an inflating mechanism including a cap, a centrally-located opening defined by said cap, a tube, a plunger, and a plunger disabling mechanism, said inflating mechanism cap for engaging the canister, said inflating mechanism cap being provided with a conduit in fluid communication with the canister opening of the canister, said cap opening for receiving said plunger in slidable engagement, said cap opening of said inflating mechanism cap being in fluid communication with the canister opening of the canister when the membrane is punctured, said tube for placing said conduit of said inflating mechanism cap in fluid communication with said balloon, said tube defining a proximal end dimensioned to be closely received within said through opening, said tube defining a distal end portion dimensioned so as to be received within said neck of said balloon, said plunger defining a shaft having a cross-section substantially similar to a cross-section of said cap opening, said plunger having a first end defining a knob for actuating said plunger and a second end defining a piercing member for rupturing the membrane, said piercing member rupturing the membrane when an axial force is applied to said plunger knob and transmitted through said plunger shaft to said piercing member, said plunger being biased away from the opening of the canister by the lighter-than-air gas upon release thereof from the canister, said plunger disabling mechanism being dimensioned to have a selected thickness, said plunger disabling mechanism being interposed between said plunger knob and said inflating mechanism cap to prohibit said plunger from unselected axial movement, thereby prohibiting said piercing member from unselectively engaging and puncturing the membrane, said plunger disabling mechanism including a slotted opening dimensioned to releasably receive said plunger shaft when said plunger disabling mechanism is interposed between said plunger knob and said inflating mechanism cap, said plunger disabling mechanism further including a grasping device for aiding a user in grasping said plunger disabling mechanism to facilitate releasing said plunger disabling mechanism from between said plunger knob and said inflating mechanism cap to permit engagement and rupture of the membrane by said piercing member by application of an axial force to said plunger knob: and a neck-closing piece, said neck-closing piece dimensioned so as to be closely received around said neck of said balloon, said neck-closing piece biasing said neck of said balloon in a sealed position.

2. The rescue kit of claim 1 wherein said neck of said balloon is self-sealing.

3. The rescue kit of claim 1 further comprising a waterproof pouch for receiving said balloon, said inflating mechanism, the canister, said securing line, and said spool.

4. The rescue kit of claim 3 wherein said rescue kit includes at least one accessory from the group consisting of a thermal blanket, a lightstick, a police whistle, waterproof matches, and a ground flare.

5. A rescue kit for marking the position of a person, said rescue kit comprising:

a canister defining a cavity for containing a lighter-than-air gas, said canister being provided with an opening for accessing said cavity of said canister and having a membrane for sealing said canister opening;

a balloon for receiving said lighter-than-air gas, said balloon including a body and a neck;

a spool defining a cylindrical opening dimensioned to receive said canister in a friction fit;

a securing line defining first and second ends, said first end of said securing line being secured to said balloon, said second end of said securing line being secured to said spool;

an inflating mechanism for selectively rupturing said membrane and for communicating said lighter-than-air gas from said canister to said balloon, said inflating mechanism being secured to said canister, said inflating mechanism including a cap for engaging said canister and a plunger for selectively rupturing said membrane, said inflating mechanism cap being provided with a conduit in fluid communication with said canister opening, said inflating mechanism cap also defining a centrally-located opening in fluid communication with said canister opening, said cap opening also for receiving said plunger in slidable engagement, said plunger defining a shaft having a cross-section substantially similar to a cross-section of said cap opening, said plunger having a first end defining a knob for actuating said plunger and a second end defining a piercing member for rupturing said membrane, said piercing member rupturing said membrane when an axial force is applied to said plunger knob and transmitted through said plunger shaft to said piercing member, said plunger being biased away from said opening of said canister by said lighter-than-air gas upon release thereof from said canister, said inflating mechanism including a tube for placing said conduit of said inflating mechanism cap in fluid communication with said balloon, said tube defining a distal end portion dimensioned so as to be received within said neck of said balloon, said tube defining a proximal end dimensioned to be closely received within said cap opening, said inflating mechanism being provided with a plunger disabling mechanism, said plunger disabling mechanism being dimensioned to have a selected thickness, said plunger disabling mechanism including a slotted opening dimensioned to releasably receive said plunger shaft between said plunger knob and said canister, said plunger disabling mechanism being interposed between said plunger knob and said inflating mechanism cap such as to prevent said plunger from unselected axial movement, thereby prohibiting said piercing member from unselectively engaging and puncturing said membrane, said plunger disabling mechanism further including a grasping device for aiding a user in grasping said plunger disabling mechanism to facilitate disengaging said plunger disabling mechanism from between said plunger knob and said inflating mechanism cap to permit engagement and rupture of said membrane by said piercing member by application of an axial force to said plunger knob; and a neck-closing piece dimensioned so as to be received around said neck of said balloon, said neck-closing piece biasing said neck of said balloon in a sealed position.

6. The rescue kit of claim 5 wherein said neck of said balloon is self-sealing.

* * * * *